(12) United States Patent
Yoshioka et al.

(10) Patent No.: US 11,387,872 B2
(45) Date of Patent: Jul. 12, 2022

(54) WIRELESS BASE STATION AND WIRELESS COMMUNICATION METHOD

(71) Applicant: NTT DOCOMO, INC., Tokyo (JP)

(72) Inventors: Shohei Yoshioka, Tokyo (JP); Satoshi Suyama, Tokyo (JP); Jun Mashino, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 92 days.

(21) Appl. No.: 16/486,041

(22) PCT Filed: Nov. 20, 2017

(86) PCT No.: PCT/JP2017/041584
§ 371 (c)(1),
(2) Date: Aug. 14, 2019

(87) PCT Pub. No.: WO2018/150666
PCT Pub. Date: Aug. 23, 2018

(65) Prior Publication Data
US 2020/0052745 A1    Feb. 13, 2020

(30) Foreign Application Priority Data
Feb. 15, 2017  (JP) .............................. JP2017-026241

(51) Int. Cl.
*H04B 7/0456* (2017.01)
*H04B 7/024* (2017.01)
(Continued)

(52) U.S. Cl.
CPC .......... *H04B 7/0456* (2013.01); *H04B 7/024* (2013.01); *H04B 7/0617* (2013.01); *H04W 72/046* (2013.01); *H04W 88/06* (2013.01)

(58) Field of Classification Search
CPC .... H04B 7/0456; H04B 7/024; H04B 7/0617; H04B 7/0626; H04W 72/046;
(Continued)

(56) References Cited

U.S. PATENT DOCUMENTS

2010/0034146 A1   2/2010  Hou et al.
2012/0202431 A1*  8/2012  Hawryluck ............ H04B 7/024
                                                    455/63.4
(Continued)

FOREIGN PATENT DOCUMENTS

JP       2011-530893 A     12/2011
JP       2012-124815 A      6/2012
(Continued)

OTHER PUBLICATIONS

Office Action issued in the counterpart European Patent Application No. 17896429.2, dated May 17, 2021 (7 pages).
(Continued)

*Primary Examiner* — Iqbal Zaidi
(74) *Attorney, Agent, or Firm* — Osha Bergman Watanabe & Burton LLP

(57) ABSTRACT

Radio base station 10 in a radio communication system that performs MIMO transmission between a plurality of radio base stations and at least one user terminal 20 includes: precoding section 110 that applies precoding to data signals based on channel information indicating channels between radio base stations 10 and the user terminal; and communication section 112 that transmits the precoded data signals, in which the precoding in a first radio base station of the plurality of radio base stations is applied based on the channel information including at least a channel between the first radio base station and a first user terminal connected to a second radio base station other than the first radio base station.

4 Claims, 9 Drawing Sheets

(51) Int. Cl.
*H04B 7/06* (2006.01)
*H04W 72/04* (2009.01)
*H04W 88/06* (2009.01)

(58) Field of Classification Search
CPC ... H04W 88/06; H04W 72/085; H04W 36/04; H04L 5/0048
See application file for complete search history.

(56) References Cited

U.S. PATENT DOCUMENTS

| | | | | |
|---|---|---|---|---|
| 2014/0256341 | A1* | 9/2014 | Nayeb Nazar | H04W 72/082 455/452.1 |
| 2015/0141032 | A1* | 5/2015 | Aydin | H04W 72/085 455/452.2 |

FOREIGN PATENT DOCUMENTS

| | | |
|---|---|---|
| JP | 2013-009024 A | 1/2013 |
| JP | 2013-236387 A | 11/2013 |
| JP | 2014-154916 A | 8/2014 |

OTHER PUBLICATIONS

Extended European Search Report in counterpart European Application No. 17896429.2 dated Jan. 29, 2021 (12 pages).
Intel Corporation; "Motivation for SI: Further LTE D2D Enhancement for eMBB and Wearables"; 3GPP TSG RAN Meeting #70, RP-151756; Sitges, Spain; Dec. 7-10, 2015 (12 pages).
Partial Supplementary European Search Report issued in European Application No. 17896429.2, dated Sep. 28, 2020 (13 pages).
International Search Report issued in PCT/JP2017/041584 dated Jan. 16, 2018 (3 pages).
Written Opinion of the International Searching Authority issued in PCT/JP2017/041584 dated Jan. 16, 2018 (3 pages).
Obara, T. et al.; "Joint Processing of Analog Fixed Beamforming and CSI-based Precoding for Super High Bit Rate Massive MIMO Transmission Using Higher Frequency Bands"; IEICE Transactions on Communications, vol. E98-B, No. 8, Aug. 2015, pp. 1474-1481 (8 pages).
Decision of Refusal issued in the counterpart Japanese Patent Application No. 2017-026241, dated May 28, 2019 (8 pages).
Notice of Reasons for Refusal issued in the counterpart Japanese Patent Application No. 2017-026241, dated Oct. 30, 2018 (9 pages).

* cited by examiner

WIRELESS BASE STATION AND WIRELESS COMMUNICATION METHOD

TECHNICAL FIELD

The present invention relates to a radio base station and a radio communication method.

BACKGROUND ART

In a UMTS (Universal Mobile Telecommunications System) network, Long Term Evolution (LTE) is specified for a higher data rate, lower latency, and the like. For a broader bandwidth and a higher speed based on LTE, successor systems of LTE are also studied (for example, the systems are called LTE-A (LTE-Advanced), FRA (Future Radio Access), 5G (5th generation mobile communication system), 5G+(5G plus), and New-RAT (Radio Access Technology)).

In a future radio communication system (for example, 5G), the use of Massive MIMO (Multiple Input Multiple Output) using a large number of antenna elements (for example, more than 100 elements) in a high frequency band (for example, 5 GHz or higher) is studied to further increase the speed and reduce the interference in signal transmission.

An example of a technique of controlling beams or streams in MIMO includes a method of combining digital precoding/postcoding (hereinafter, simply referred to as precoding/postcoding in some cases) and beam-forming (BF) (for example, see NPL 1).

CITATION LIST

Non-Patent Literature

NPL 1 T. Obara et al.: "Joint Processing of Analog Fixed Beamforming and CSI-based Precoding for Super High Bit Rate Massive MIMO Transmission Using Higher Frequency Bands," IEICE Transactions on Communications VOL. E98-B, NO. 8 Aug. 2015

SUMMARY OF INVENTION

Technical Problem

However, beam control in an environment (multi-site environment) including a plurality of sites (also referred to as cells in some cases) formed by base stations (hereinafter, also referred to as Massive MIMO base stations in some cases) using Massive MIMO is not sufficiently examined.

An aspect of the present invention provides a radio base station and a radio communication method that can appropriately control beams in the multi-site environment.

Solution to Problem

An aspect of the present invention provides a radio base station in a radio communication system that performs MIMO transmission between a plurality of radio base stations and at least one user terminal, the radio base station including: a precoding section that applies precoding to a data signal based on channel information indicating channels between the radio base stations and the user terminal; and a communication section that transmits the precoded data signal, in which the precoding in a first radio base station of the plurality of radio base stations is applied based on the channel information including at least a channel between the first radio base station and a first user terminal connected to a second radio base station other than the first radio base station.

Advantageous Effects of Invention

According to the aspect of the present invention, the beams can be appropriately controlled in the multi-site environment.

DESCRIPTION OF EMBODIMENTS

Figure 1:
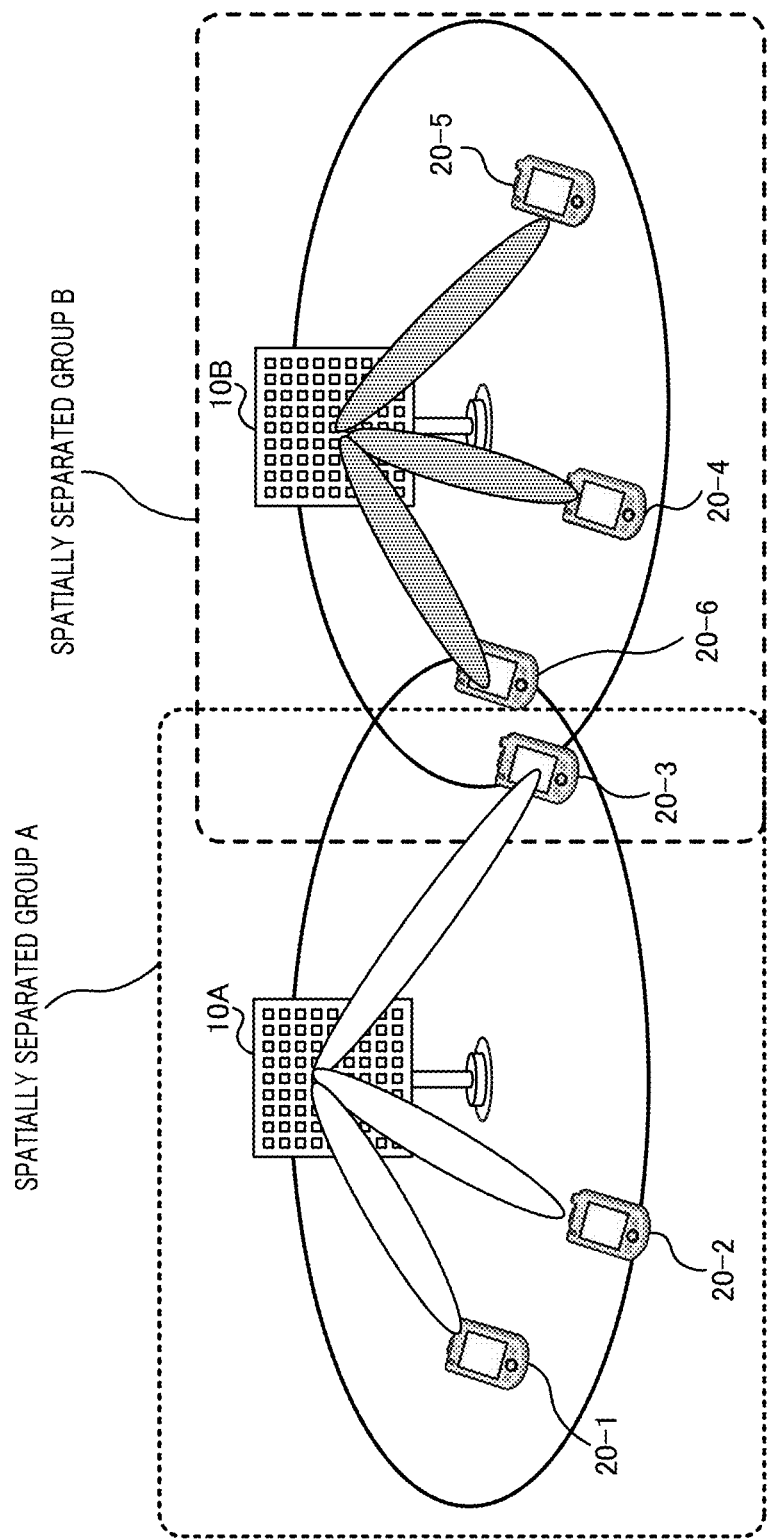
FIG. 1 illustrates a configuration example of a radio communication system according to Embodiment 1.

Hereinafter, embodiments of the present invention will be described in detail with reference to the accompanying drawings.

Streams are distributed and multiplexed for a plurality of user terminals in MU-MIMO (Multi-User MIMO) transmission in the case described below. BF and precoding/postcoding are performed in Massive MIMO in the case described below. Therefore, precoding/postcoding and beam-forming are performed in the MU-MIMO transmission between a radio base station and a plurality of user terminals in a radio communication system according to the present invention.

Hereinafter, the precoding will be sorted into precoding for inter-user interference (IUI) and precoding for inter-stream interference (ISI) in each user terminal. Precoding is performed for the inter-user interference, and precoding and postcoding are performed for the inter-stream interference in each user terminal.

In an example illustrated below, the radio base station includes $N_T$ antenna elements and performs Massive MIMO transmission in the downlink between the radio base station and $N_U$ user terminals. The number of antenna elements of an i-th (i=1 to $N_U$) user terminal is $N_{Ri}$, and the number of streams is $M_i$.

In this case, reception signal r received by each user terminal is expressed by the following equation 1.

[1]
$$r = \begin{bmatrix} r_0 \\ r_1 \\ \vdots \\ r_{N_U-1} \end{bmatrix} = \begin{bmatrix} H_0 \\ H_1 \\ \vdots \\ H_{N_U-1} \end{bmatrix} WP \begin{bmatrix} d_0 \\ d_1 \\ \vdots \\ d_{N_U-1} \end{bmatrix} + z \quad \text{(Equation 1)}$$

$$= \begin{bmatrix} H_0 \\ H_1 \\ \vdots \\ H_{N_U-1} \end{bmatrix} WP^{IUI} P^{ISI} \begin{bmatrix} d_0 \\ d_1 \\ \vdots \\ d_{N_U-1} \end{bmatrix} + z$$

$$= \begin{bmatrix} \tilde{H}_0 P_0^{ISI} & & 0 \\ & \tilde{H}_1 P_1^{ISI} & \\ & & \ddots & \\ 0 & & & \tilde{H}_{N_U-1} P_{N_U-1}^{ISI} \end{bmatrix} \begin{bmatrix} d_0 \\ d_1 \\ \vdots \\ d_{N_U-1} \end{bmatrix} + z$$

Here, $H_i$ (i=0 to $N_U-1$) represents channel information (channel matrix) of the i-th user terminal multiplexed in the MU-MIMO transmission, W represents a BF weight, $P^{IUI}$ represents a precoding matrix for the inter-user interference, $P^{ISI}$ represents a precoding matrix for the inter-stream interference, $d_i$ (i=0 to $N_U-1$) represents a stream for i-th user terminal, and z represents noise.

As shown in equation 1, precoding processing ($P^{IUI}$) for the inter-user interference in the precoding (for example, block diagonalization) orthogonalizes the channels between the user terminals and prevents the inter-user interference.

Signal y obtained by postcoding of reception signal r received by each user terminal is expressed by the following equation 2.

[2]
$$y = \begin{bmatrix} y_0 \\ y_1 \\ \vdots \\ y_{N_U-1} \end{bmatrix} = \begin{bmatrix} B_0^{ISI} r_0 \\ B_1^{ISI} r_1 \\ \vdots \\ B_{N_U-1}^{ISI} r_{N_U-1} \end{bmatrix} = \text{diag}(\ldots) \begin{bmatrix} d_0 \\ d_1 \\ \vdots \\ d_{N_U-1} \end{bmatrix} + \tilde{z} \quad \text{(Equation 2)}$$

In equation 2, $B_i^{ISI}$ (i=0 to $N_U-1$) represents a postcoding matrix of the inter-stream interference for the i-th user terminal. As shown in equation 2, precoding matrix $P^{ISI}$ and postcoding matrix $B^{ISI}$ orthogonalize the channels between the streams of the user terminals and prevent the inter-stream interference.

Note that precoding matrices ($P^{IUI}$, $P^{ISI}$) and postcoding matrix ($B^{ISI}$) may be computed by, for example, singular value decomposition (SVD) using channel information (channel matrix) between the radio base station and the user terminal.

The precoding processing and the beam-forming processing are processing for a plurality of user terminals connected to one radio base station. Therefore, the processing is processing in a site formed by a single Massive MIMO base station.

On the other hand, to increase the efficiency and maintain the quality of the high frequency band communication in the future, beam control, such as precoding processing and beam-forming processing, in sites (multiple sites) formed by a plurality of Massive MIMO base stations needs to be examined.

Therefore, a method of appropriately controlling the beams in the multi-site environment will be described in the following embodiments.

Embodiment 1

<Radio Communication System>

FIG. 1 shows a configuration example of a radio communication system according to the present embodiment. The radio communication system according to the present embodiment includes a plurality of radio base stations 10 and at least one user terminal 20. The radio base station 10 is, for example, a Massive MIMO base station.

Each user terminal 20 is connected to (accesses) at least one radio base station 10. In the example illustrated in FIG. 1, user terminals 20-1 to 20-3 are connected to radio base station 10A, and user terminals 20-4 to 20-6 are connected to radio base station 10B.

<Radio Base Station>

Figure 2:
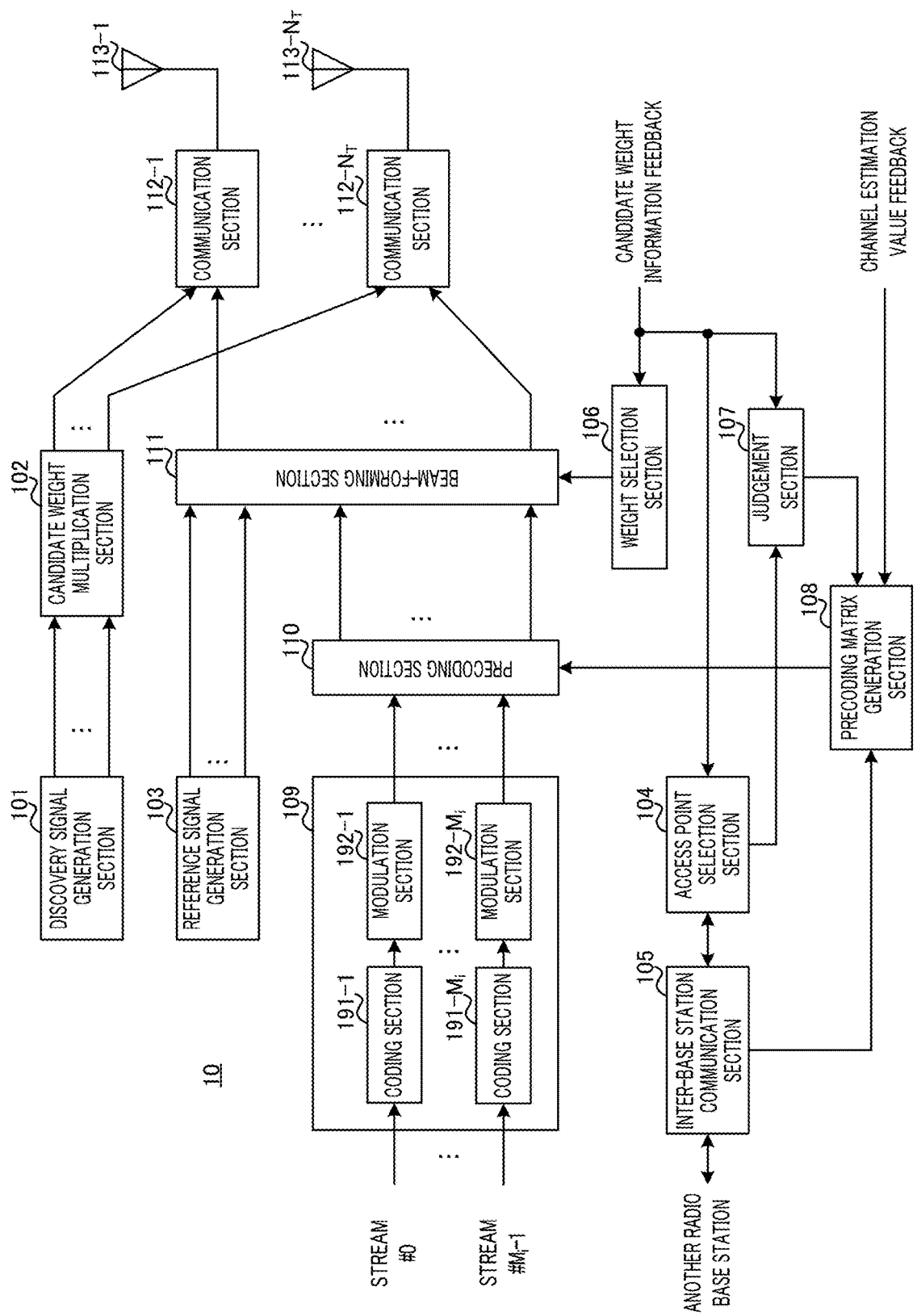
FIG. 2 is a block diagram showing a configuration example of a radio base station according to Embodiment 1.

FIG. 2 illustrates an example of an overall configuration of the radio base station according to the present embodiment. Radio base station 10 shown in FIG. 2 includes discovery signal generation section 101, candidate weight multiplication section 102, reference signal generation section 103, access point selection section 104, inter-base station communication section 105, weight selection section 106, judgement section 107, precoding matrix generation section 108, data generation section 109, precoding section 110, beam-forming section 111, communication sections 112, and antennas 113.

Note that constituent sections (for example, IFFT processing section and CP adding section) and the like for generating an OFDM (Orthogonal Frequency Division Multiplexing) signal in radio base station 10 are not illustrated in FIG. 2. Furthermore, the signal waveform of the signal transmitted from radio base station 10 is not limited to the waveform based on OFDM modulation.

Discovery signal generation section 101 generates discovery signals (reference signals) for deciding BF weight (W). For example, discovery signal generation section 101 generates at least the same number of discovery signals as the number of candidates of the BF weight. Discovery signal generation section 101 outputs the generated discovery signals to candidate weight multiplication section 102.

Candidate weight multiplication section 102 multiplies the discovery signals input from discovery signal generation section 101 by the candidates of the BF weight, respectively, and outputs the discovery signals multiplied by the BF weight candidates to communication sections 112.

Reference signal generation section 103 generates a reference signal used for channel estimation and outputs the reference signal to beam-forming section 111.

Access point selection section 104 selects user terminal 20 to be connected to radio base station 10 among the plurality of radio base stations 10 based on candidate weight information fed back from each user terminal 20. Examples of the candidate weight information include an SNR (Signal to Noise Ratio) of the discovery signal multiplied by the candidate weight and received power.

For example, for each user terminal 20, access point selection section 104 selects radio base station 10 that generates the BF weight with the maximum candidate weight information (received power) and sets radio base station 10 as a radio base station as an access point of user terminal 20. Access point selection section 104 may, for example, notify user terminal 20 connected to radio base station 10 of access point information indicating radio base station 10 as an access point of user terminal 20 (not illustrated). Each user terminal 20 performs a connection operation for radio base station 10 indicated in the access point information. Access point selection section 104 may also, for example, notify other radio base stations 10 of the access point information indicating radio base station 10 as an access point of user terminal 20 through inter-base station communication section 105. Alternatively, access point selection section 104 may specify user terminal 20 to be connected to radio base station 10 based on the access point information reported from other radio base stations 10 through inter-base station communication section 105.

Inter-base station communication section 105 communicates with other radio base stations 10 or a control station (may also be referred to as a central control station) that controls a plurality of radio base stations 10 through, for example, a backhaul.

Weight selection section 106 selects BF weight (W) to be used for beam-forming from the BF weight candidates based on the candidate weight information fed back from each user terminal 20 and outputs BF weight (W) to beam-forming section 111. For example, weight selection section 106 may select L BF weights not overlapping with each other, in descending order of SNR (or received power) indicated in the candidate weight information.

Judgement section 107 judges whether to execute extended precoding based on the candidate weight information fed back from each user terminal 20. For example, judgement section 107 specifies user terminals 20 other than user terminals 20 connected to radio base station 10 (that is, user terminals 20 not connected to radio base station 10) based on the access point information input from access point selection section 104. Judgement section 107 then judges to execute the extended precoding when there is user terminal 20 in which the SNR indicated in the candidate weight information is smaller than predetermined threshold σ among user terminals 20 not connected to radio base station 10. On the other hand, judgement section 107 judges to execute normal precoding without executing the extended precoding when there is no user terminal 20 in which the SNR indicated in the candidate weight information is smaller than predetermined threshold σ among user terminals 20 not connected to radio base station 10. Judgement section 107 outputs the judgement result to precoding matrix generation section 108.

Note that the normal precoding is precoding applied based on channel estimation values fed back from user terminals 20 connected to single radio base station 10. On the other hand, the extended precoding is precoding applied based on channel estimation values including channels between radio base station 10 and user terminals 20 connected to radio base station 10 and channels between radio base station 10 and user terminals 20 connected to radio base stations 10 other than radio base station 10, in which the SNR of user terminals 20 is smaller than predetermined threshold σ.

Hereinafter, a precoding matrix generated in the normal precoding based on the channel estimation values indicating the channels between single radio base station 10 and user terminals 20 connected to radio base station 10 will be referred to as a "normal precoding matrix". A precoding matrix generated in the extended precoding based on the channel estimation values including the channels between radio base station 10 and user terminals 20 connected to radio base station 10 and the channels between radio base station 10 and user terminals 20 connected to other radio base stations 10 will be referred to as an "extended precoding matrix".

Based on the judgement result input from judgement section 107, precoding matrix generation section 108 uses the channel estimation values fed back from user terminals 20 to generate the normal precoding matrix or the extended precoding matrix.

Note that the channel estimation value is, for example, channel information (HW) indicating the equivalent channel matrix including BF weight (W).

Specifically, precoding matrix generation section 108 generates precoding matrix ($P^{IUI}$) for removing the interference between a plurality of user terminals 20 (inter-user interference) multiplexed in the MU-MIMO and precoding matrix ($P^{ISI}$) for removing the interference between a plurality of streams (inter-stream interference) in each user terminal 20. Precoding matrix generation section 108 also generates an extended precoding matrix for removing interference of user terminals 20 that are interfered by radio base station 10 and that are connected to radio base stations other than radio base station 10.

Precoding matrix generation section 108 outputs generated precoding matrices ($P^{IUI}$, $P^{ISI}$) (hereinafter, collectively referred to as "P" in some cases) to precoding section 110.

Data generation section 109 generates data (downlink signals) for a plurality of user terminals 20. Note that FIG. 2 shows a configuration of data generation section 109 for one user terminal 20 (i-th user terminal 20). However, radio base station 10 includes data generation section 109 for each of a plurality of ($N_U$) user terminals 20.

Data generation section 109 includes coding sections 191 and modulation sections 192. Coding sections 191 and modulation sections 192 are provided according to the number of streams ($M_i$) for user terminal i. Each coding section 191 encodes data signals of $M_i$ streams. Each modulation section 192 modulates the encoded data signals and outputs the modulated data signals to precoding section 110. Note that the code rate and the modulation scheme in each coding section 191 and each modulation section 192 may be different in each stream.

Precoding section 110 multiplies the data signals input from data generation section 109 by precoding matrix (P) and outputs the precoded data signals to beam-forming section 111. For example, precoding section 110 applies precoding to the data signals of M streams to generate L (the number of beams, for example, L>M) signals.

In the channel estimation, beam-forming section 111 multiplies the reference signal input from reference signal generation section 103 by BF weight W input from weight selection section 106 and outputs the reference signal after the BF weight multiplication to communication section 112. According to the processing, each user terminal 20 can use the reference signal multiplied by BF weight (W) decided based on the candidate weight information (SNR) to estimate equivalent channel information (HW) including the BF weight.

At data transmission, beam-forming section 111 multiplies the data signals input from precoding section 110 by BF weight (W) input from weight selection section 106 and outputs the data signals ($N_T$ signals) after the BF weight multiplication to communication section 112.

Communication sections 112-1 to 112-$N_T$ are provided according to $N_T$ antennas 113 (antenna elements). Each communication section 112 applies transmission processing, such as D/A conversion and up-conversion, to the input signals. Each communication section 112 multiplexes the signals after the transmission processing based on, for example, time-division, frequency-division, or code-division multiplexing and transmits the signals from $N_T$ antennas 113, respectively. Specifically, each communication section 112 transmits the discovery signal input from candidate weight multiplication section 102 to each user terminal 20 through antenna 113. In the channel estimation, communication section 112 transmits the reference signal input from beam-forming section 111 to each user terminal 20 through antenna 113. At data transmission, communication section 112 transmits the signal of the stream input from beam-forming section 111 to each user terminal 20 through antenna 113.

<User Terminal>

Figure 3:
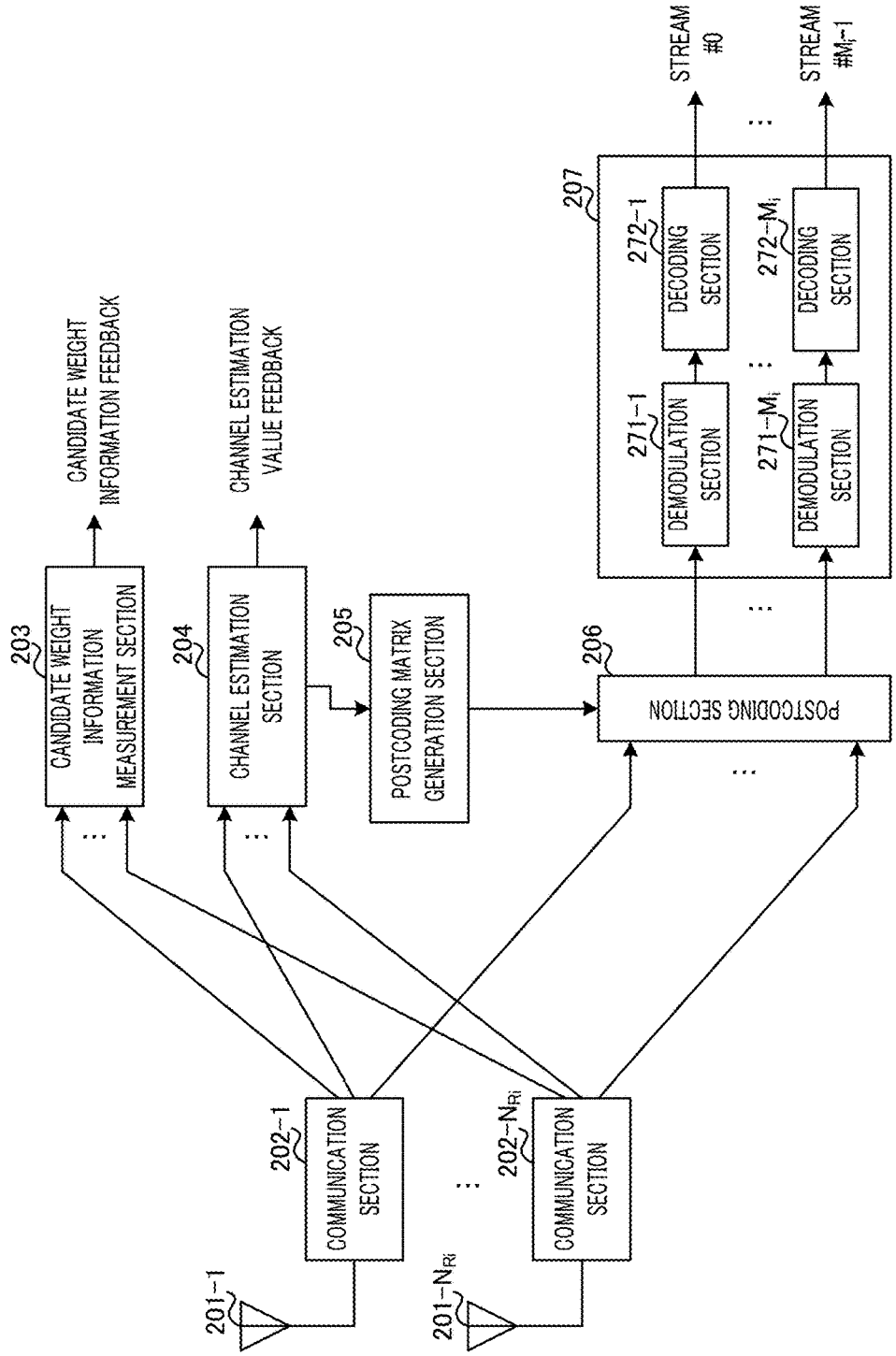
FIG. 3 is a block diagram showing a configuration example of a user terminal according to Embodiment 1.

FIG. 3 illustrates an example of an overall configuration of the user terminal according to the present embodiment. User terminal 20 shown in FIG. 3 includes antennas 201, communication sections 202, candidate weight information measurement section 203, channel estimation section 204, postcoding matrix generation section 205, postcoding section 206, and data reception section 207.

Note that FIG. 3 shows an example of the configuration of i-th user terminal 20. Constituent sections (for example, CP removing section and FFT processing section) and the like for receiving the OFDM signal in user terminal 20 are not illustrated in FIG. 3. The signal waveform of the signal received by user terminal 20 is not limited to the waveform based on the OFDM modulation.

Communication sections 202-1 to 202-$N_{Ri}$ are provided according to $N_{Ri}$ antennas 201, respectively. Each communication section 202 applies reception processing, such as down-conversion and A/D conversion, to the reception signals received through antenna 201. Here, examples of the reception signals include the discovery signal, the reference signal, and the data signal. Communication section 202 outputs the discovery signal to candidate weight information measurement section 203, outputs the reference signal to channel estimation section 204, and outputs the data signal to postcoding section 206.

Candidate weight information measurement section 203 uses the discovery signals input from communication sections 202 to measure the candidate weight information (for example, SNR or received power). The discovery signals are multiplied by the BF weight candidates, respectively. Therefore, candidate weight information measurement section 203 measures the SNR or the received power for each BF weight candidate used. The candidate weight information indicating the measured SNR or received power is fed back to radio base station 10 through, for example, communication section 202.

Channel estimation section 204 uses the reference signal input from communication section 202 to estimate the channel estimation value (channel information) indicating the channel between radio base station 10 and user terminal 20. The reference signal is multiplied by BF weight (W) in radio base station 10 (beam-forming section 111). Therefore, channel estimation section 204 estimates equivalent channel information including the BF weight (equivalent channel matrix HW). Estimated channel information (HW) is fed back to radio base station 10 (precoding matrix generation section 108) through, for example, communication section 202. Channel estimation section 204 also outputs the estimated channel information to postcoding matrix generation section 205.

Postcoding matrix generation section 205 uses channel information (HW) input from channel estimation section 204 to generate postcoding matrix ($B^{ISI}$). Postcoding matrix generation section 205 outputs the generated postcoding matrix to postcoding section 206. Note that postcoding matrix generation section 205 may use channel information HWP estimated by using the reference signal multiplied by the precoding matrix (extended precoding matrix) and the BF weight to generate the postcoding matrix.

Postcoding section 206 uses postcoding matrix ($B^{ISI}$) input from postcoding matrix generation section 205 to perform postcoding of the data signal input from communication section 202. Postcoding section 206 outputs the data signal after the postcoding to data reception section 207.

Data reception section 207 applies reception processing (including demodulation processing and decoding processing) to the data signal input from postcoding section 206 and obtains a plurality of streams for i-th user terminal 20. Data reception section 207 includes demodulation sections 271 and decoding sections 272. Demodulation sections 271 and decoding sections 272 are provided according to the number of streams ($M_i$) for i-th user terminal 20. Each demodulation section 271 demodulates the data signals of $M_i$ streams, and each decoding section 272 decodes the demodulated data signals to obtain $M_i$ streams. Note that the code rate and the modulation scheme in each demodulation section 271 and each decoding section 272 may be different in each stream.

<Operation of Radio Base Station 10 and User Terminal 20>

Next, operation of radio base station 10 and user terminal 20 will be described in detail.

Note that in the following description, the radio communication system includes AP radio base stations 10 and AP×$N_U$ user terminals 20.

Figure 4:
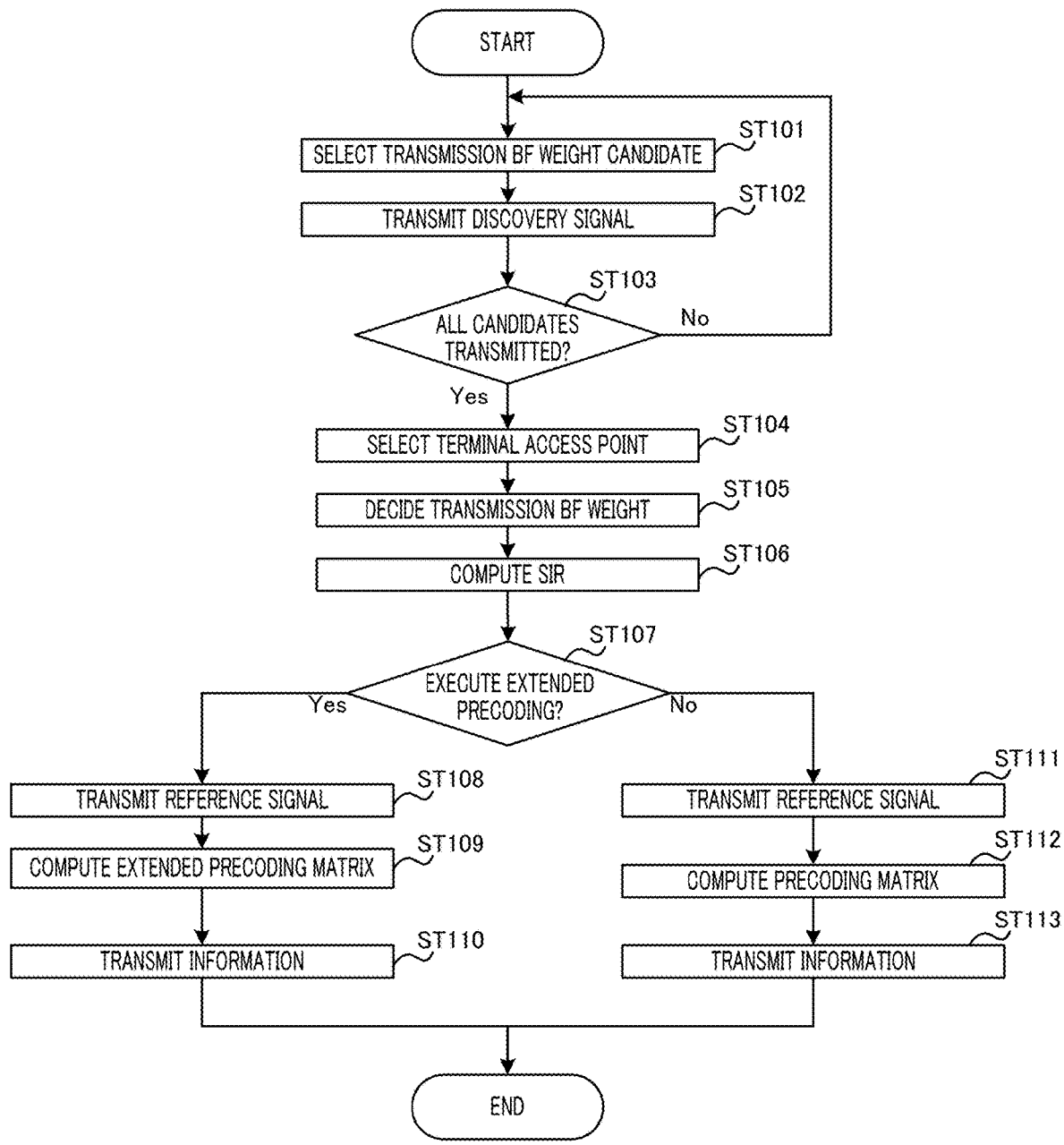
FIG. 4 is a flow chart showing an operation example of the radio base station according to Embodiment 1.

FIG. 4 is a flow chart showing an operation of radio base station 10 according to the present embodiment.

First, radio base station 10 selects one of the candidates for BF weight (W) (ST101). Radio base station 10 then transmits the discovery signal multiplied by the selected candidate for BF weight (W) to user terminal 20 (ST102). If radio base station 10 has not transmitted the discovery signals corresponding to all of the candidates for BF weight (W) (ST103: No), radio base station 10 returns to the processing of ST101 and ST102 and transmits the discovery signal multiplied by another candidate for BF weight (W).

The discovery signal multiplied by the candidate for the BF weight is not precoded and is transmitted to all antennas 201 of all user terminals 20. The discovery signal may be assigned to, for example, radio resources (subcarriers) in one symbol (for example, one OFDM symbol) based on frequency-division multiplexing or may be assigned to a plurality of symbols based on time-division multiplexing. The discovery signal may also be transmitted between a plurality of radio base stations 10 based on time-division multiplexing, frequency-division multiplexing, or code-division multiplexing. In this way, the method of multiplexing and transmitting the discovery signals to the radio resources allows radio base station 10 to efficiently select the BF weight described later.

For example, a reception signal (reception signal vector) of the discovery signal transmitted from i-th radio base station 10 in each user terminal 20 is expressed by the following equation 3.

[3]

$$r_i = \begin{bmatrix} r_{i,0} \\ r_{i,1} \\ \vdots \\ r_{i,N_{AP-1}N_U-1} \end{bmatrix} \begin{bmatrix} H_{i,0} \\ H_{i,1} \\ \vdots \\ H_{i,N_{AP-1}N_U-1} \end{bmatrix} w_{i,x} p + z_i \quad \text{(Equation 3)}$$

In equation 3, $r_{i,j}$ (j=0 to $N_{AP-1}N_U-1$) represents a reception signal from i-th radio base station 10 in j-th user terminal 20, $H_{i,j}$ (j=0 to $N_{AP-1}N_U-1$) represents channel information (channel matrix) between j-th user terminal 20 and i-th radio base station 10, $w_{i,x}$ represents x-th BF weight candidate (vector) in i-th radio base station 10, p represents a discovery signal, and $z_i$ represents noise corresponding to i-th radio base station 10.

Each user terminal 20 uses the reception signal (discovery signal) indicated in equation 3 to measure the candidate weight information (for example, SNR or received power) and feeds back the candidate weight information to radio base station 10.

After transmitting the discovery signals corresponding to all of the candidates for BF weight (W) (ST103: Yes), radio base station 10 uses the candidate weight information fed back from each user terminal 20 to select radio base station 10 as the access point of each user terminal 20 (ST104). For example, radio base station 10 follows a maximum received power standard indicated in the following equation 4 to select radio base station 10 ($i_j^{opt}$-th radio base station 10) that generates BF weight $w_{i,x}$ with maximum received power ($\|H_{i,j}w_{i,x}p+z_i\|^2$) as the access point of j-th user terminal 20.

[4]
$$i_j^{opt} = \underset{i,x}{\mathrm{argmax}} \|H_{i,j}w_{i,x}p + z_{i,j}\|^2 \quad \text{(Equation 4)}$$

For example, radio base station 10A is selected as the access point of user terminals 20-1 to 20-3, and radio base station 10B is selected as the access point of user terminals 20-4 to 20-6 in the example of the radio communication system shown in FIG. 1.

Next, radio base station 10 selects (decides) BF weight (W) to be used for beam-forming from the BF weight candidates based on the candidate weight information used to select the access point (ST104) of user terminal 20 (ST105). Radio base station 10 may select, for example, L BF weights not overlapping with each other, in descending order of SNR or received power indicated in the candidate weight information. For example, BF weight vector $W_i^{opt}$ including L BF weights of i-th radio base station 10 is expressed by the following equation 5.

[5]
$$W_i^{opt} = [w_{i,1} \cdots w_{i,L}] \quad \text{(Equation 5)}$$

Next, radio base station 10 uses the candidate weight information fed back from each user terminal 20 to compute SIR (Signal to Interference power Ratio) indicating a signal to site interference power ratio of user terminal 20 other than user terminals 20 connected to radio base station selected in ST104 (that is, user terminal 20 connected to another radio base station 10). For example, i-th radio base station 10 computes $SIR_j$ of j-th user terminal 20 according to the following equation 6.

[6]
$$SIR_j = \frac{\|H_{i,j}W_i^{opt}p + z_{i,j}\|^2}{\sum_{k \neq i}\|H_{k,j}W_k^{opt}p + z_{k,j}\|^2} \quad \text{(Equation 6)}$$

More specifically, a numerator component of equation 6 indicates the received power of the signal of i-th radio base station 10 (that is, desired signal of j-th user terminal 20), and a denominator component of equation 6 indicates the received power of the signal (that is, interference signal for j-th user terminal 20) of radio base station 10 (k(≠i)-th radio base station 10) other than i-th radio base station 10.

Next, radio base station 10 determines whether to execute the extended precoding based on whether there is user terminal 20 in which the SIR computed in ST106 is smaller than threshold σ (ST107).

For example, when the SIR for j-th user terminal 20 connected to i-th radio base station 10 is smaller than threshold σ in equation 6, k(≠i)-th radio base station 10 that most interferes with j-th user terminal 20 may determine to generate the extended precoding matrix. Note that radio base station 10 that generates the extended precoding matrix is not limited to radio base station 10 that most interferes with j-th user terminal 20. A predetermined number of radio base stations 10 in descending order of interference with j-th user terminal 20 or all radio base stations 10 that interfere with j-th user terminal 20 may generate the extended precoding matrix.

If k-th radio base station 10 determines to execute the extended precoding (ST107: Yes), k-th radio base station 10 multiplies the reference signal by BF weight ($W_k^{opt}$) selected in ST105 and transmits the reference signal multiplied by the BF weight to user terminal 20 (ST108).

User terminal 20 uses the received reference signal to estimate channel information (HW) and feeds back estimated channel information HW (channel estimation value) to radio base station 10. User terminal 20 also uses estimated channel information HW to generate a postcoding matrix.

Radio base station 10 uses channel information HW fed back from user terminal 20 to generate extended precoding matrix ($P^{opt}$) (ST109). For example, k-th radio base station 10 uses channel information (equivalent channel matrix) $H_k^{ext}W_k^{ext}$ including channel information HW of $(kN_U)$-th to $((k+1)N_U-1)$-th user terminals 20 connected to k-th radio base station 10 and channel information HW of j-th user terminal 20 with SIR smaller than threshold σ that is connected to i-th radio base station 10 to compute extended precoding matrix $P_k^{opt}$ according to the following equation 7.

[7]
$$H_k^{ext}W_k^{ext} = \begin{bmatrix} H_{k,kN_U} \\ H_{k,kN_U+1} \\ \vdots \\ H_{k,(k+1)N_U-1} \\ H_{k,j} \end{bmatrix} W_k^{opt} \quad \text{(Equation 7)}$$

Therefore, k-th radio base station 10 computes extended precoding matrix $P_k^{opt}$ in consideration of the channel information of user terminal 20 connected to k-th radio base station 10 as well as the channel information of j-th user terminal 20 with respect to k-th radio base station 10, j-th user terminal 20 being interfered by k-th radio base station 10 and connected to i-th radio base station 10. The k-th radio base station 10 uses the equivalent channel matrix indicated in equation 7 to generate extended precoding matrix $P_k^{opt}$ for removing the interference for j-th user terminal 20 interfered by k-th radio base station 10.

Therefore, the extended precoding in k-th radio base station 10 is applied based on the channel information including the channels between k-th radio base station 10 and user terminals 20 connected to k-th radio base stations 10 and the channel between k-th radio base station 10 and user terminal 20 connected to radio base station 10 (i-th radio base station 10) other than k-th radio base station 10.

Radio base station 10 then multiplies the signal (information) of the stream by extended precoding matrix ($P_k^{opt}$) and BF weight ($W_k^{opt}$) and transmits the signal of the stream to user terminal 20 (ST110). In this case, radio base station 10 does not transmit, to user terminal 20 connected to another radio base station 10 (user terminal 20 in which the SIR is smaller than threshold σ), the signal in which channel information is considered for the signal when the extended precoding matrix is generated.

For example, reception signal $r_k^{ext}$ received by $(kN_U)$-th to $((k+1)N_U-1)$-th user terminals 20 connected to k-th radio base station 10 is expressed by the following equation 8.

$$r_k^{ext} = \begin{bmatrix} r_{k,kN_U} \\ \vdots \\ r_{k,(k+1)N_U-1} \\ 0 \end{bmatrix} = H_k^{ext} W_k^{opt} P_k^{opt} \begin{bmatrix} d_{k,kN_U} \\ \vdots \\ d_{k,(k+1)N_U-1} \\ 0 \end{bmatrix} + z_k^{ext} \quad \text{(Equation 8)}$$

$$= \begin{bmatrix} \tilde{H}_{k,kN_U} & & & 0 \\ & \ddots & & \\ & & \tilde{H}_{k,(k+1)N_U-1} & \\ 0 & & & \tilde{H}_{k,j} \end{bmatrix} \begin{bmatrix} d_{k,kN_U} \\ \vdots \\ d_{k,(k+1)N_U-1} \\ 0 \end{bmatrix} + z_k^{ext}$$

As indicated in equation 8, k-th radio base station 10 does not transmit the data to j-th user terminal 20 interfered by k-th radio base station 10 (that is, $d_{k,j}=0$).

The data multiplied by extended precoding matrix ($P_k^{opt}$) is transmitted by avoiding the interference of j-th user terminal 20. User terminal 20 multiplies the received signal of the stream by postcoding matrix ($B^{ISI}$) to demodulate the signal (data) of the stream (not illustrated). The inter-stream interference is rejected in the data multiplied by precoding matrix ($P^{ISI}$) and postcoding matrix ($B^{ISI}$).

On the other hand, if radio base station 10 determines not to execute the extended precoding in FIG. 4 (ST107: No), radio base station 10 multiplies the reference signal by BF weight ($W_k^{opt}$) selected in ST105 and transmits the reference signal multiplied by the BF weight to user terminal 20 (ST111). User terminal 20 uses the received reference signal to estimate channel information (HW) and feeds back estimated channel information HW (channel estimation value) to radio base station 10. User terminal 20 also uses estimated channel information HW to generate a postcoding matrix.

Radio base station 10 uses channel information HW fed back from user terminal 20 to generate normal precoding matrix (P) (ST112). For example, k-th radio base station 10 uses channel information (equivalent channel matrix) HW including channel information HW of $(kN_U)$-th to $((k+1)N_U-1)$-th user terminals 20 connected to k-th radio base station 10 to compute precoding matrix P.

Radio base station 10 then multiplies the signal (information) of the stream by precoding matrix (P) and BF weight ($W_k^{opt}$) and transmits the signal of the stream to user terminal 20 (ST113).

An example will be described, in which the SIR of user terminal 20-3 with respect to radio base station 10A is smaller than threshold σ, and radio base station 10B most interferes with user terminal 20-3 in the radio communication system shown in FIG. 1. The SIRs of all of user terminals 20-4 to 20-6 with respect to radio base station 10B are equal to or greater than threshold σ.

In this case, radio base station 10A determines not to execute the extended precoding. More specifically, radio base station 10A uses channel information HW of user terminals 20-1 to 20-3 connected to radio base station 10A to generate the normal precoding matrix. Therefore, spatially separated group A as a group to be precoded (spatially separated) in radio base station 10A includes user terminals 20-1 to 20-3 connected to radio base station 10A as shown in FIG. 1.

On the other hand, radio base station 10B determines to execute the extended precoding. More specifically, radio base station 10B uses channel information HW of user terminal 20-3 connected to radio base station 10A in addition to channel information HW of user terminals 20-4 to 20-6 connected to radio base station 10B to generate the extended precoding matrix. Therefore, the group (spatially separated group B) to be precoded (spatially separated) in radio base station 10B includes user terminal 20 interfered by radio base station 10B in addition to user terminals 20-4 to 20-6 connected to radio base station 10B as shown in FIG. 1.

In other words, user terminal 20-3 shown in FIG. 1 is included in both of spatially separated group A and spatially separated group B. Therefore, the channel information of user terminal 20-3 connected to radio base station 10A and significantly interfered by radio base station 10B is used to generate the precoding matrix in both radio base station 10A and radio base station 10B. In this case, a precoding matrix for removing the interference (ISI or IUI) with respect to the stream for user terminal 20-3 is generated in radio base station 10A, and an extended precoding for removing signal components interfering with user terminal 20-3 is generated in radio base station 10B.

According to the processing, user terminal 20-3 can efficiently receive the stream from radio base station 10A while rejecting the interference from radio base station 10B.

Advantageous Effects of Present Embodiment

In this way, the extended precoding in radio base station 10B of radio base stations 10 shown in FIG. 1 is applied in the present embodiment based on, for example, the channel information including the channels between radio base station 10B and user terminals 20-4 to 20-6 connected to radio base station 10B and the channel between radio base station 10B and user terminal 20-3 connected to radio base station 10A other than radio base station 10B.

Therefore, the spatial separation processing for user terminals 20 is executed in all of the sites in consideration of the interference between the plurality of sites formed by radio base stations 10, and the interference between the sites can be reduced. More specifically, radio base station 10A and radio base station 10B cooperate to execute the spatial separation processing for user terminal 20-3 connected to radio base station 10A in the present embodiment.

Therefore, according to the present embodiment, the beams can be appropriately controlled in the multi-site environment, and the efficiency of the MU-MIMO transmission can be improved.

Modifications of Embodiment 1

Note that the parameter used as a reference in selecting the BF weight or selecting the access point of user terminal 20 is not limited to the SNR or the received power in the present embodiment, and some candidate weight information (for example, reception correlation) measured by using the discovery signal multiplied by the BF weight candidate may be used.

In the case described in the present embodiment, the discovery signal transmitted from radio base station 10 to user terminal 20 is used to measure the candidate weight information (for example, received power of BF weight candidate). However, the present embodiment is not limited to this, and for example, user terminal 20 may transmit the reference signal to radio base station 10, and radio base station 10 may use the received reference signal to select the BF weight, select the access point of user terminal 20, or generate the precoding matrix. According to the processing, the feedback of the discovery signal, the candidate weight information, and channel information (HW) are not necessary. Therefore, the use of the radio resources in the channel estimation processing can be reduced.

In the case described in the present embodiment, the access point of user terminal 20 is selected based on the maximum received power standard regarding radio base stations 10 as indicated in equation 4. However, the present embodiment is not limited to this, and another method may be used to select the access point of user terminal 20. In the present embodiment, the access point of user terminal 20 may be selected based on another standard, such as a maximum signal to interference power ratio standard, instead of the maximum received power standard.

In the case described in the present embodiment, the BF weight is selected based on the maximum received power standard in each radio base station 10. However, the present embodiment is not limited to this, and the BF weight may be selected based on another standard, such as a maximum signal to interference power ratio standard.

In the example described in the present embodiment, there is one user terminal 20 in which the SIR is smaller than threshold $\sigma$ in equation 8. However, when there are a plurality of user terminals 20 in which the SIR is smaller than threshold $\sigma$, radio base station 10 may use the equivalent channel matrix including the channel information of the plurality of user terminals 20 to compute the extended precoding matrix. According to the processing, the extended precoding matrix can be used to reduce the interference for each user terminal 20 in which the SIR is smaller than threshold $\sigma$.

In the case described in the present embodiment, whether the SIR of user terminal 20 is smaller than threshold $\sigma$ is judged to determine whether radio base station 10 executes the extended precoding. However, the present embodiment is not limited to this, and whether to execute the extended precoding matrix may be determined based on another standard. For example, radio base station 10 may apply the extended precoding to user terminals 20 with SIR in bottom x % among user terminals 20. According to the process, radio base station 10 can surely reduce the interference for user terminals 20 with SIR in bottom x %.

In the case described in the present embodiment, radio base station 10 interfering with user terminal 20 (radio base station 10 executing the extended precoding) does not transmit the user data to user terminal 20 (for example, $d_{k,j}=0$ in equation 8). However, the present embodiment is not limited to this, and when the user data can be transmitted between radio base stations 10 in the backhaul, radio base station 10 may receive the user data from another radio base station 10 that is the access point of user terminal 20 interfered by radio base station 10 and transmit the user data to user terminal 20. Therefore, radio base station 10 interfering with user terminal 20 generates the extended precoding matrix for removing the interference of the user data for user terminal 20 in this case. According to the processing, the interference can be rejected for user terminal 20, and the throughput can be improved.

In the case described in the present embodiment, the SIR is used as a determination criterion for the execution of the extended precoding. However, the determination criterion for the execution of the extended precoding is not limited to this, and other parameters indicating the status of interference between sites may be used.

Embodiment 2

The spatial separation processing for the space influenced by a plurality of sites is described in Embodiment 1. In contrast, a plurality of radio base stations apply beams in the space influenced by a plurality of sites to transmit data in a case described in the present embodiment.

Note that the basic configurations of the radio base station and the user terminal according to the present embodiment are the same as the basic configurations of radio base station 10 and user terminal 20 according to Embodiment 1, and the radio base station and the user terminal will be described with reference to FIGS. 2 and 3.

Figure 5:
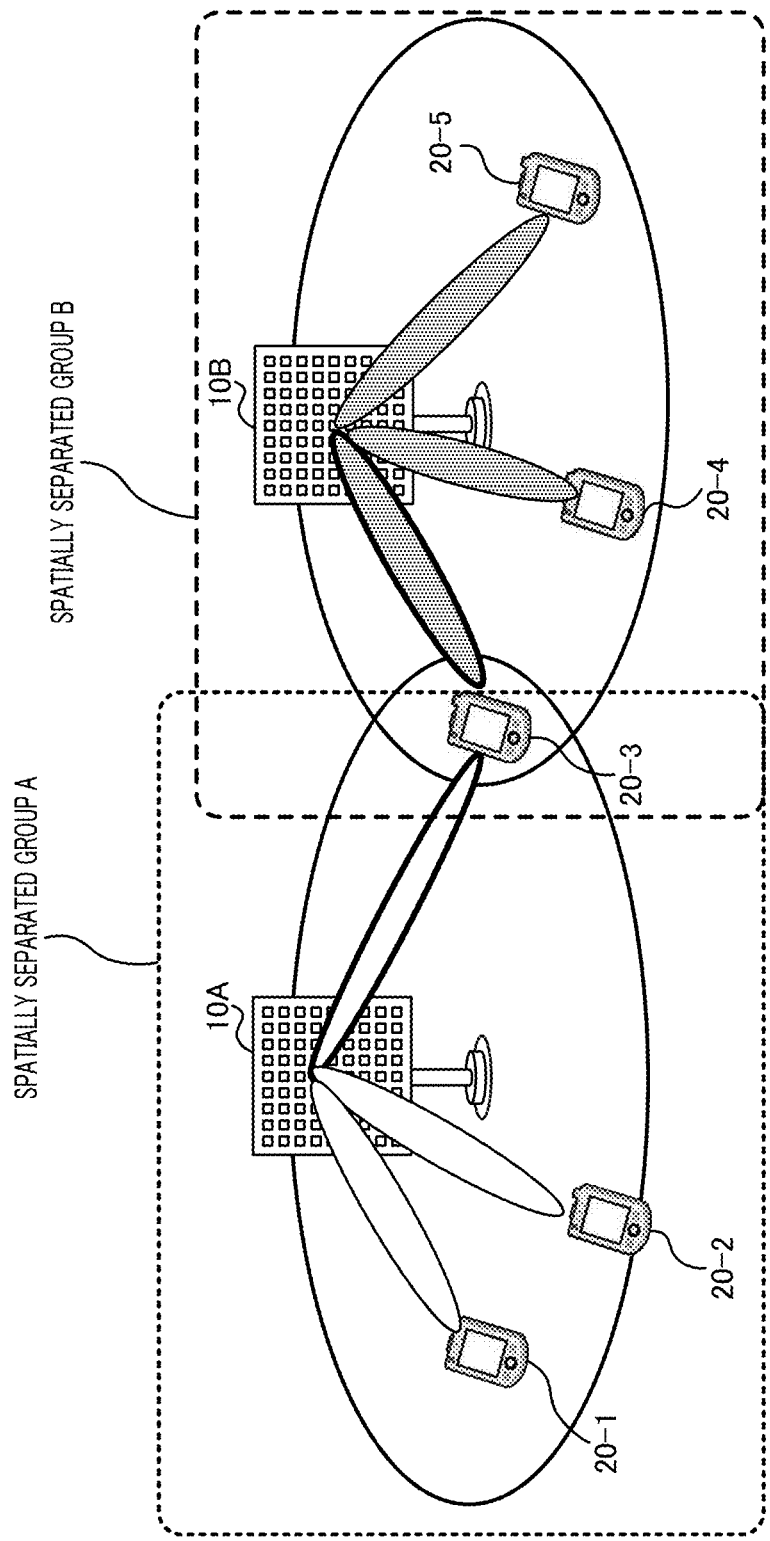
FIG. 5 illustrates a configuration example of a radio communication system according to Embodiment 2.

FIG. 5 shows a configuration example of a radio communication system according to the present embodiment.

As in Embodiment 1, the radio communication system according to the present embodiment includes a plurality of radio base stations 10 (for example, Massive MIMO base stations) and at least one user terminal 20. Each user terminal 20 is connected to at least one radio base station 10. In the example illustrated in FIG. 5, user terminals 20-1 to 20-3 are connected to radio base station 10A, and user terminals 20-3 to 20-5 are connected to radio base station 10B. Therefore, user terminal 20-3 is connected to both of radio base station 10A and radio base station 10B.

Figure 6:
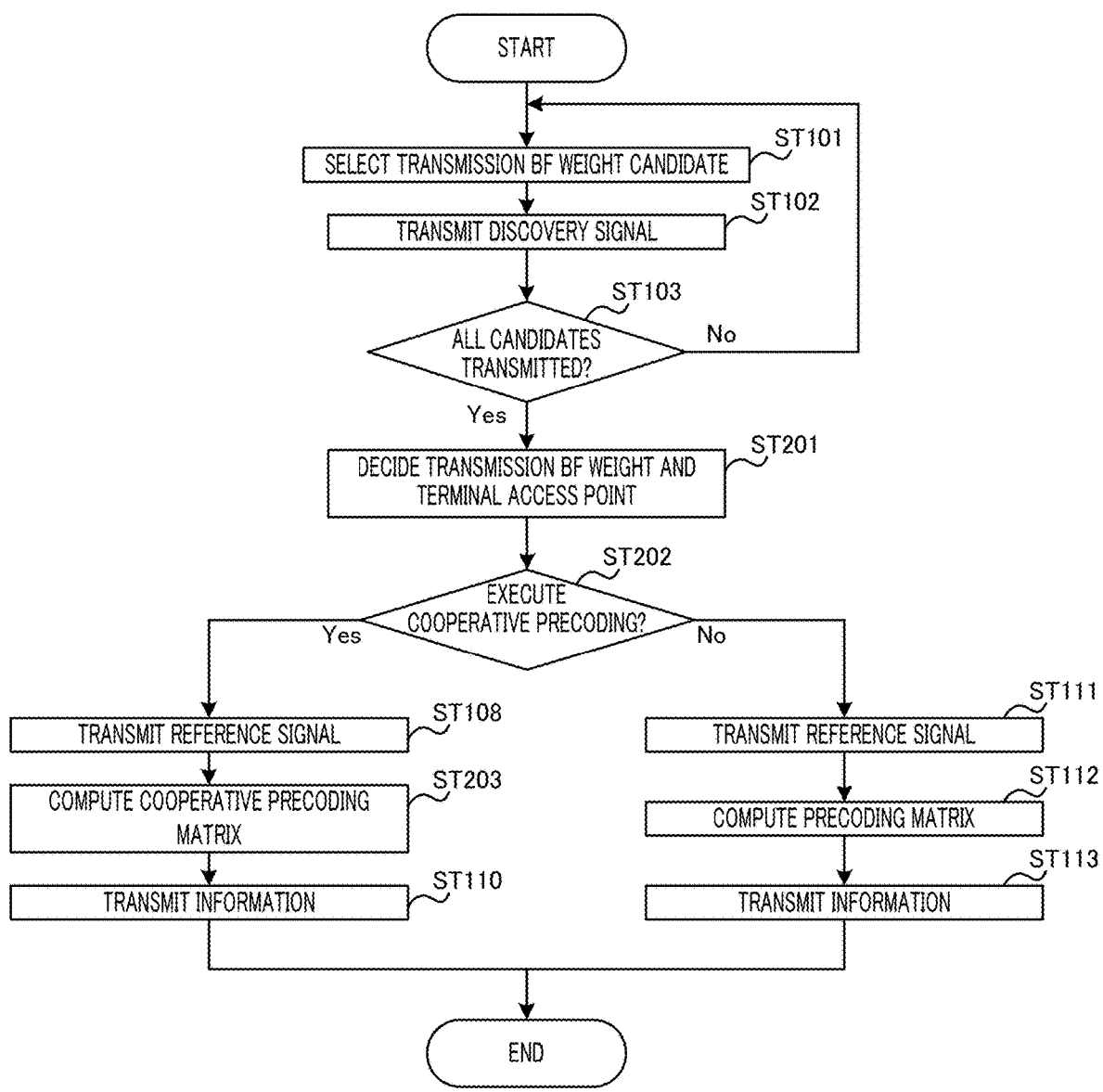
FIG. 6 is a flow chart showing an operation example of the radio base station according to Embodiment 2.

FIG. 6 is a flow chart illustrating operation of radio base station 10 according to the present embodiment. Note that in FIG. 6, the same processing as in Embodiment 1 (FIG. 4) are provided with the same reference signs, and the description will not be repeated.

Radio base station 10 (access point selection section 104 and weight selection section 106) transmits the discovery signals corresponding to all of the candidates for BF weight (W) (ST103: Yes) and then uses the candidate weight information (received power or SNR) fed back from each user terminal 20 to select radio base station 10 as the access point of each user terminal 20 and the BF weight (ST201). In this case, radio base station 10 selects the access point of user terminal 20 and the BF weight based on a maximum received power standard obtained by adding the candidate weight information for a plurality of radio base stations 10. For example, each radio base station 10 may receive the candidate weight information for other radio base stations 10 from other radio base stations 10 through inter-base station communication section 105.

For example, i-th radio base station 10 selects, for example, user terminal (j) and BF weight (x) with maximum received power ($\|H_{i,j}w_{i,x}p+z_{i,j}\|^2$) according to the maximum received power standard indicated in the following equation 9.

[9]

$$(j^{opt}, x^{opt}) = \underset{j,x}{\operatorname{argmax}} \|H_{i,j} w_{i,x} p + z_{i,j}\|^2 \qquad \text{(Equation 9)}$$

For example, i-th radio base station 10 decides i-th radio base station 10 as the access point of $j^{opt}$-th user terminal 20 selected according to equation 9. As indicated in the following equation 10, i-th radio base station 10 further decides 1-th BF weight wo of i-th radio base station 10 as BF weight ($W_{i,xopt}$) selected according to equation 9 (for example, l=1 to L).

[10]

$$w_{i,l} = w_{i,x}^{opt} \qquad \text{(Equation 10)}$$

Therefore, each radio base station 10 selects L beams (combinations of user terminal (j) and BF weight (x)) with maximum received power. Radio base station 10 may select, for example, L BF weights in descending order of received power and user terminals 20 corresponding to the BF weights not overlapping with each other. BF weight vector $W_i^{opt}$ constituted by L BF weights of i-th radio base station 10 is expressed by, for example, the following equation 11.

[11]

$$W_i^{opt} = [w_{i,1} \ldots w_{i,L}]. \qquad \text{(Equation 11)}$$

As a result, a plurality of radio base stations 10 apply beams to user terminal 20 selected by radio base stations 10, and the data is transmitted.

For example, in the example of the radio communication system shown in FIG. 5, radio base station 10A selects user terminals 20-1 to 20-3 as user terminals 20 to be connected to radio base station 10A, and radio base station 10B selects user terminals 20-3 to 20-5 as user terminals 20 to be connected to radio base station 10B. Therefore, user terminal 20-3 is connected to both of radio base station 10A and radio base station 10B.

Next, radio base station 10 (judgement section 107) determines whether to execute cooperative precoding based on the access point of user terminal 20 selected in ST201 (ST202).

Here, the cooperative precoding is precoding executed for user terminal 20 connected to a plurality of radio base stations 10 by applying an equivalent channel matrix constituted by channel estimation values between radio base stations 10 connected to user terminal 20 and user terminal 20. Hereinafter, the precoding matrix generated by using the channel estimation values between radio base stations 10 connected to user terminal 20 and user terminal 20 will be referred to as a "cooperative precoding matrix".

Specifically, radio base station 10 determines to execute the cooperative precoding for user terminal 20 when user terminal 20 connected to radio base station 10 is also connected to another radio base station 10. For example, each radio base station 10 may receive the information indicating user terminal 20 connected to another radio base station 10 from radio base station 10 through inter-base station communication section 105. For example, radio base station 10A and radio base station 10B determine to execute the cooperative precoding in FIG. 5 because user terminal 20-3 is connected to both.

If radio base station 10 (precoding matrix generation section 108) determines to execute the cooperative precoding (ST202: Yes), radio base station 10 uses channel information HW fed back from user terminal 20 in ST108 to generate the cooperative precoding matrix (ST203).

Specifically, of the precoding matrices, radio base station 10 computes precoding matrix ($P^{IUI}$) for rejecting the inter-user interference based on the channel information between radio base station 10 and user terminal 20 connected to radio base station 10.

On the other hand, of the precoding matrices, radio base station 10 computes precoding matrix ($P^{ISI}$) for rejecting the inter-stream interference based on the channel information between user terminal 20 and a plurality of radio base stations 10 (including radio base station 10) connected with user terminal 20.

For example, when j-th user terminal 20 is connected to $i_{\#1}$-th radio base station 10 and $i_{\#2}$-th radio base station 10, each of $i_{\#1}$-th radio base station 10 and $i_{\#2}$-th radio base station 10 uses channel information $\tilde{H}_j^{cmp}$ indicated in the following equation 12 to generate cooperative precoding matrix ($P^{ISI}$) for j-th user terminal 20.

[12]

$$\tilde{H}_j^{cmp} = [\tilde{H}_{i_{\#1},j} \tilde{H}_{i_{\#2},j}] \qquad \text{(Equation 12)}$$

In equation 12, $\tilde{H}_{i\,\#1,j}$ represents the channel information between $i_{\#1}$-th radio base station 10 and j-th user terminal 20, and $\tilde{H}_{i\,\#2,j}$ represents the channel information between $i_{\#2}$-th radio base station 10 and j-th user terminal 20.

Therefore, for user terminal 20 connected to a plurality of radio base stations 10 including radio base station 10, each radio base station 10 generates cooperative precoding matrix ($P^{ISI}$) for removing the interference between a plurality of streams transmitted from radio base stations 10 to user terminal 20.

For example, in FIG. 5, each of radio base station 10A and radio base station 10B uses the channel information (for example, equation 12) including the channel information between radio base station 10A and user terminal 20-3 and the channel information between radio base station 10B and user terminal 20-3 to generate cooperative precoding matrix ($P^{ISI}$) Therefore, as shown in FIG. 5, user terminal 20-3 is included in both of the group (spatially separated group A) to be precoded (spatially separated) in radio base station 10A and spatially separated group B of radio base station 10B.

Radio base station 10A and radio base station 10B shown in FIG. 5 then transmit the data multiplied by precoding matrices ($P^{IUI}$, $P^{ISI}$) to user terminal 20-3. User terminal 20-3 multiplies the received signals of the streams by postcoding matrix ($B^{ISI}$) to demodulate the signals (data) of the streams. In the data multiplied by cooperative precoding matrix ($P^{ISI}$) and postcoding matrix ($B^{ISI}$), the inter-stream interference is rejected for all of the streams from radio base station 10A and the streams from radio base station 10B.

According to the processing, user terminal 20-3 can efficiently receive the data of the beams applied from radio base stations 10A and 10B while rejecting the inter-stream interference from radio base stations 10A and 10B.

Advantageous Effects of Present Embodiment

In this way, when user terminal 20 is connected to a plurality of radio base stations 10 in the present embodiment, the cooperative precoding in radio base stations 10 is applied to remove the interference between a plurality of streams transmitted from radio base stations 10.

Therefore, when a plurality of radio base stations 10 cooperate to apply beams to one user terminal 20 to transmit data, the spatial separation processing is executed for user terminal 20 in consideration of the interference between the streams transmitted from radio base stations 10, and the interference between the streams can be reduced.

According to the present embodiment, the beams can be appropriately controlled in the multi-site environment, and the efficiency of the MU-MIMO transmission can be improved.

Modifications of Embodiment 2

Note that the parameter used as a reference in selecting the BF weight or selecting the access point of user terminal 20 is not limited to the SNR or the received power in the present embodiment, and some candidate weight information (for example, reception correlation) measured by using the discovery signal multiplied by the BF weight candidate may be used as in Embodiment 1.

In the case described in the present embodiment, the discovery signal transmitted from radio base station 10 to user terminal 20 is used to measure the candidate weight information (for example, received power of BF weight candidate). However, the present embodiment is not limited to this, and for example, user terminal 20 may transmit the reference signal to radio base station 10, and radio base station 10 may use the received reference signal to select the BF weight, select the access point of user terminal 20, or generate the precoding matrix. According to the processing, the feedback of the discovery signal, the candidate weight information, and channel information (HW) is not necessary. Therefore, the use of the radio resources in the channel estimation processing can be reduced.

In the case described in the present embodiment, the access point of user terminal 20 and the BF weight are selected based on the maximum received power standard for a plurality of radio base stations 10 as indicated in equation 9. However, the present embodiment is not limited to this, and another method may be used to select the access point of user terminal 20 and the BF weight. In the present embodiment, the access point of user terminal 20 and the BF weight may be selected based on another standard, such as a maximum signal to interference power ratio standard, instead of the maximum received power standard.

In the present embodiment, the transmission speed may be improved by processing of multiplexing and transmitting different data streams transmitted from a plurality of radio base stations 10 to one user terminal 20, or the quality may be improved by processing of diversity transmission of the same stream.

In the case described in the present embodiment, cooperative precoding matrix ($P^{ISI}$) is generated for user terminal 20 connected to a plurality of radio base stations 10 in consideration of the inter-stream interference in user terminal 20. However, the present embodiment is not limited to this, and the channel information (for example, see equation 12) between user terminal 20 and a plurality of radio base stations 10 may be used to generate the entire precoding matrices, that is, $P^{ISI}$ and precoding matrix ($P^{IUI}$) for the inter-user interference, for user terminal 20 connected to a plurality of radio base stations 10.

Embodiment 3

Beam-forming control according to the deviation in the amount of data transmission between a plurality of sites will be described in the present embodiment.

Note that the basic configurations of a radio base station and a user terminal according to the present embodiment are the same as the basic configurations of radio base station 10 and user terminal 20 according to Embodiment 1, and the radio base station and the user terminal will be described with reference to FIGS. 2 and 3.

Figure 7A:
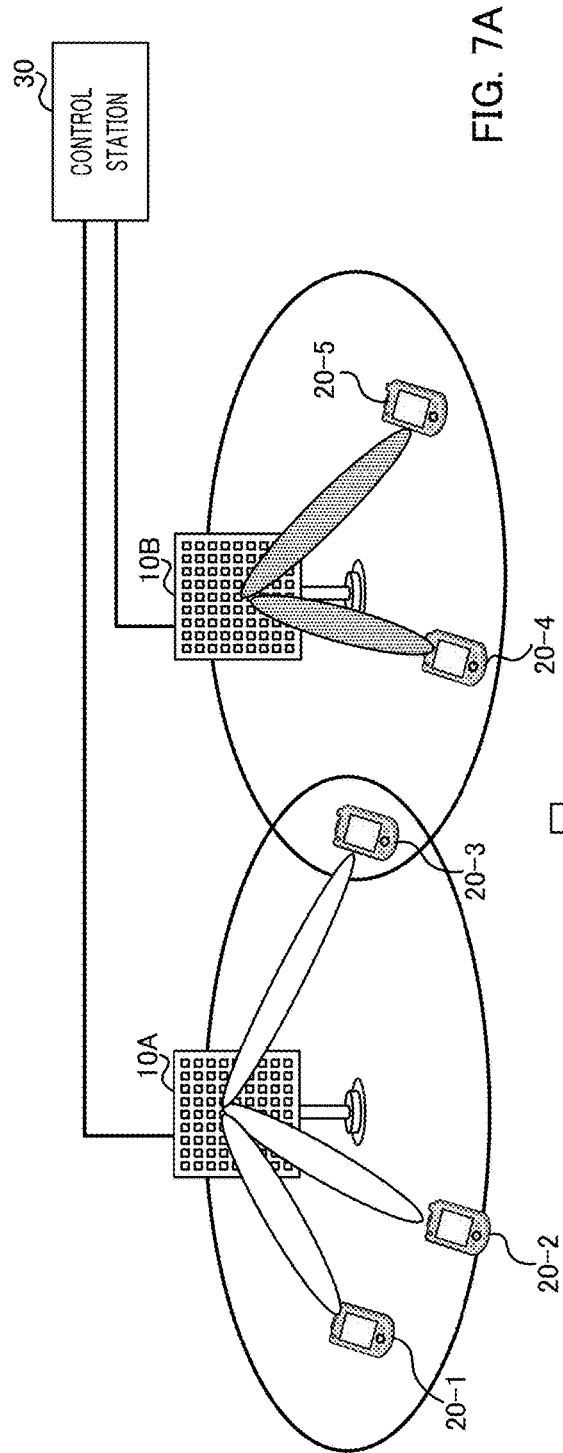
FIGS. 7A and 7B illustrate a configuration example of a radio communication system according to Embodiment 3.
Figure 7B:
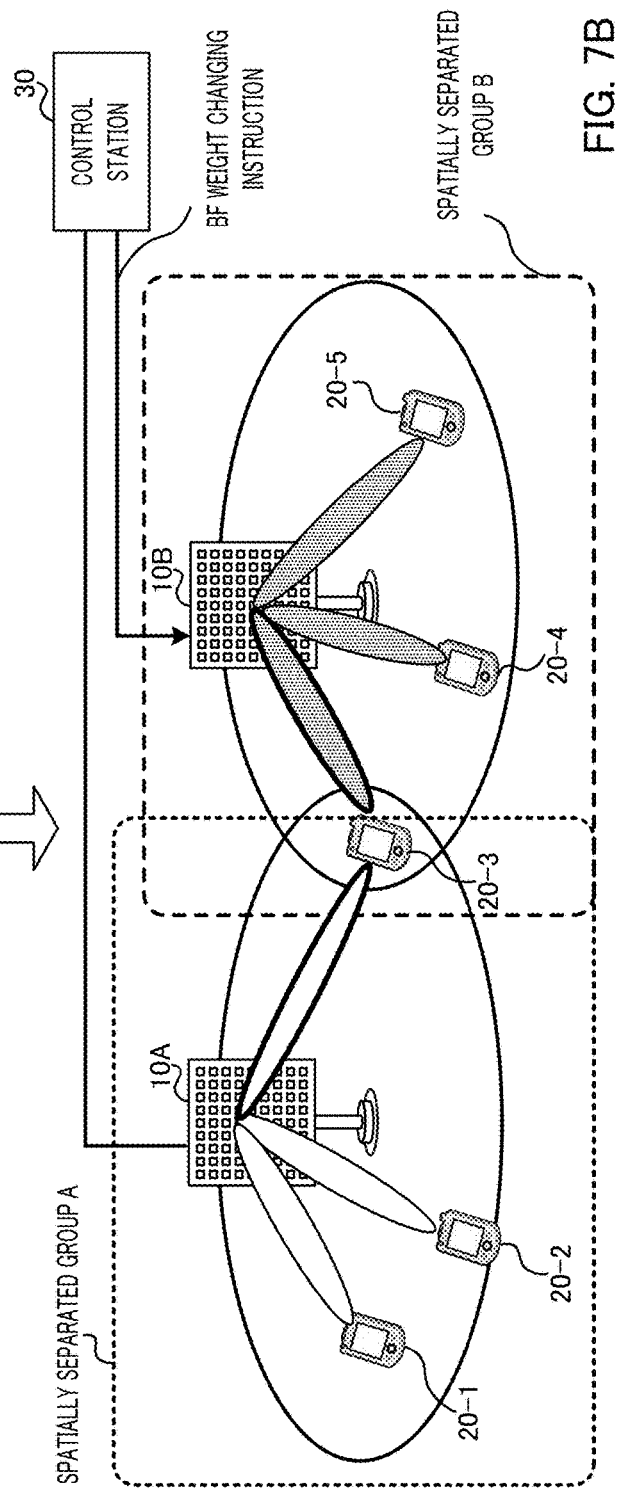

FIGS. 7A and 7B illustrate configuration examples of a radio communication system according to the present embodiment.

The radio communication system according to the present embodiment includes a plurality of radio base stations 10 (for example, Massive MIMO base stations), at least one user terminal 20, and control station 30. Each user terminal 20 is connected to at least one radio base station 10. In the example illustrated in FIG. 5, user terminals 20-1 to 20-3 are connected to radio base station 10A, and user terminals 20-4 and 20-5 are connected to radio base station 10B.

Control station 30 is connected to a plurality of radio base stations 10. Control station 30 monitors the amount of data transmission of each radio base station 10. Control station 30 instructs, for example, radio base station 10 with the amount of data transmission smaller than predetermined threshold T (that is, radio base station 10 with an extra assignable resource) to form beams for a peripheral site. Note that the processing similar to the processing by control station 30 may be executed by any of radio base stations 10.

For example, control station 30 detects that the amount of data transmission of radio base station 10B is smaller than threshold T in FIG. 7A. Therefore, control station 30 instructs radio base station 10B to change the BF weight to form beams for the site of neighboring radio base station 10A (details will be described later). For example, control station 30 here instructs radio base station 10B to form beams for user terminal 20-3 connected to radio base station 10A.

As a result of the processing, radio base station 10B forms beams for user terminal 20-3 connected to radio base station 10A as shown in FIG. 7B. Therefore, user terminal 20-3 is connected to both of radio base station 10A and radio base station 10B. Note that the beam control for user terminal 20-3 in radio base station 10A and radio base station 10B is, for example, the same as the processing described in Embodiment 2, and the details will not be described here.

According to the processing, the extra resources in radio base station 10B can be effectively used to improve the system throughput.

Figure 8:
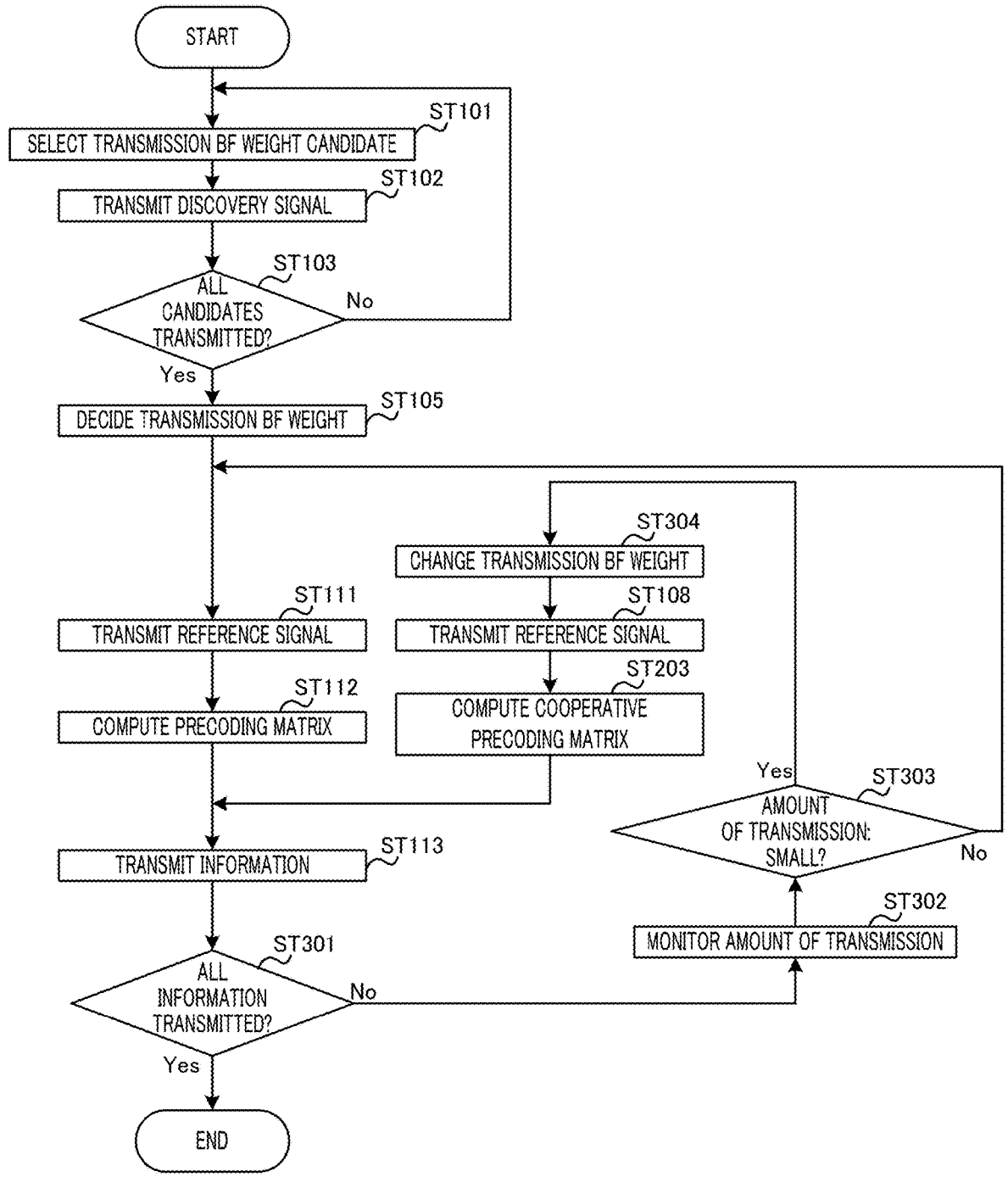
FIG. 8 is a flow chart showing an operation example of the radio base station according to Embodiment 3.

FIG. 8 is a flow chart showing operation of radio base station 10 and control station 30 according to the present embodiment. Note that in FIG. 8, the same reference signs are provided to the same processing as in Embodiment 1 (FIG. 4) or Embodiment 2 (FIG. 6), and the description will not be repeated.

In FIG. 8, each radio base station 10 first executes the beam-forming processing and the precoding processing in the site formed by each radio base station 10. More specifically, each radio base station 10 selects the BF weight in ST105 and computes the precoding matrix in ST112 to communicate with user terminals 20 connected to radio base station 10 (ST113).

If radio base station 10 has transmitted all of the data (information) to be transmitted to user terminals 20 (ST301: Yes), the processing illustrated in FIG. 8 ends.

On the other hand, if radio base station 10 has not transmitted all of the data (information) to be transmitted to user terminals 20 (ST301: No), control station 30 monitors the amount of transmission of a plurality of radio base stations 10 (ST302). Control station 30 then determines whether there is radio base station 10 in which the monitored amount of data transmission is smaller than threshold T (ST303).

Control station 30 does not do anything for radio base station 10 with the amount of data transmission equal to or greater than threshold T (ST303: No) and continues to monitor the amount of data transmission (ST302, ST303). Therefore, radio base station 10 with the amount of data transmission equal to or greater than threshold T continues the processing of ST111, ST112, and ST113.

On the other hand, control station 30 instructs radio base station 10 with the amount of data transmission smaller than threshold T (ST303: Yes) to change the BF weight to form beams for a peripheral site. Radio base station 10 instructed to change the BF weight changes the BF weight (ST304). Radio base station 10 then generates, for example, the cooperative precoding matrix (ST203) as in Embodiment 2 and transmits the data (information) to user terminal 20 (ST113).

Hereinafter, an example of the method of changing the BF weight by i-th radio base station 10 will be described.

Specifically, i-th radio base station 10 selects an $l_{del}$-th beam according to a minimum received power standard indicated in the following equation 13 from currently selected L (l=1 to L) beams. The i-th radio base station 10 may delete $L_{Ind}$ beams selected according to equation 13, for example.

[13]
$$l_{del} = \operatorname*{argmin}_{l}\|H_{i,j}w_{i,l}p + z_{i,j}\|^2 \quad \text{(Equation 13)}$$

Then, i-th radio base station 10 selects an $l_{add}$-th beam to be formed in a peripheral site (site formed by k-th radio base station 10 here) according to a maximum received power standard indicated in the following equation 14. The i-th radio base station 10 may newly form $L_{Ind}$ beams selected according to equation 14, for example.

[14]
$$l_{add} = \operatorname*{argmax}_{x}\|H_{k,j}w_{i,x}p + z_{k,j}\|^2 \quad \text{(Equation 14)}$$

Therefore, i-th radio base station 10 deletes the beams with little influence of deletion on the data transmission in the site of radio base station 10 (here, beams selected according to the minimum received power standard indicated by equation 13). Furthermore, i-th radio base station 10 changes the beams to beams highly efficient for the data transmission in the peripheral site (here, beams selected according to the maximum received power standard indicated in equation 14).

Then, i-th radio base station 10 and k-th radio base station 10 use, for example, the channel information (for example, equation 12) between both of radio base stations 10 and user terminal 20-3 to generate cooperative precoding matrix ($P^{ISI}$) for j-th user terminal 20 (ST203 shown in FIG. 8) as in Embodiment 2.

As for the site in which i-th radio base station 10 forms the beams, a site with a larger amount of data transmission (that is, a site that requires more resources) may be selected from sites around the site formed by i-th radio base station 10, or a site may be selected based on another standard. Furthermore, the data transmitted from i-th radio base station 10 to j-th user terminal 20 may be transferred from k-th radio base station 10 through inter-base station communication section 105 (backhaul), for example.

In this way, a plurality of radio base stations 10 can assign the resources (beams) that can be used by radio base stations 10 to user terminals 20 connected to other radio base stations 10 according to the usage of the resources (for example, deviation in amount of data transmission). Therefore, the resources of all of the sites can be efficiently used to control the beams.

Note that in the case described in the flow chart illustrated in FIG. 8, the processing shifts to the transmission of the reference signal (ST111 or ST305) after the judgement of the amount of data transmission in ST302 (and after the change in the BF weight). However, radio base station 10 may shift to the transmission of the discovery signal (ST101) after the judgement of the amount of data transmission in ST302 and change the BF weight based on the candidate weight information measured by using the discovery signal in ST304. According to the processing, radio base station 10 can use the candidate weight information (SNR or received power) reflecting the current channel status to change the BF weight, and the BF weight can be accurately deleted and selected.

Advantageous Effects of Present Embodiment

In this way, radio base station 10 with the amount of data transmission smaller than threshold T among radio base stations 10 executes the beam-forming (BF weight changing) processing to form the beams for user terminal 20 connected to radio base station 10 other than the radio base station 10 in the present embodiment. Therefore, radio base station 10 with the amount of data transmission smaller than threshold T executes the beam-forming (BF weight changing) processing to connect radio base station 10 and the user terminal connected to radio base station 10 other than the radio base station 10.

Thus, radio base station 10 with a small amount of data transmission among radio base stations 10 cooperates to apply beams to the site formed by radio base station 10 with a large amount of data transmission to transmit data. According to the processing, the beams can be appropriately controlled in all of the sites in the multi-site environment, and the efficiency of the MU-MIMO transmission can be improved.

Furthermore, when radio base stations 10 cooperate to transmit data to one user terminal 20, the spatial separation processing for user terminal 20 is executed in consideration of the interference between the streams transmitted from radio base stations 10 as in Embodiment 2. Therefore, the interference between the streams can be reduced.

Modifications of Embodiment 3

In the case described in the present embodiment, the amount of data transmission is used as the amount of used resources of each radio base station 10 monitored by control station 30. However, the amount of used resources of radio base station 10 is not limited to the amount of data transmission in the present embodiment, and another parameter indicating the usage of resources in each radio base station 10, the deviation in the amount of used resources between radio base stations 10, or the like may also be used. Examples of the other parameter include the number of streams transmitted by radio base station 10 and the difference between the amounts of data transmitted between radio base stations 10.

In the case described in the present embodiment, the standard based on the received power is used to change (delete and add) the BF weight as indicated in equation 13 and equation 14. However, the present embodiment is not limited to this, and for example, another standard based on the signal to interference power ratio may be used to change the BF weight.

This completes the description of embodiments.

In the case described in embodiments, the reference signal is used to perform the channel estimation. However, the channel estimation value (channel information) may be acquired without using the reference signal in the channel estimation. In other words, it is only necessary to acquire the channel information indicating equivalent channel matrix (HW) including the BF weight in the channel estimation.

Furthermore, the operation in two radio base stations 10 is described in embodiments as shown in FIGS. 1, 5, and 7. However, embodiments are not limited to this, and an operation similar to the operation in embodiments can be performed in a multi-site environment including three or more radio base stations 10.

(Hardware Configuration)

Note that the block diagrams used to describe embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

Figure 9:
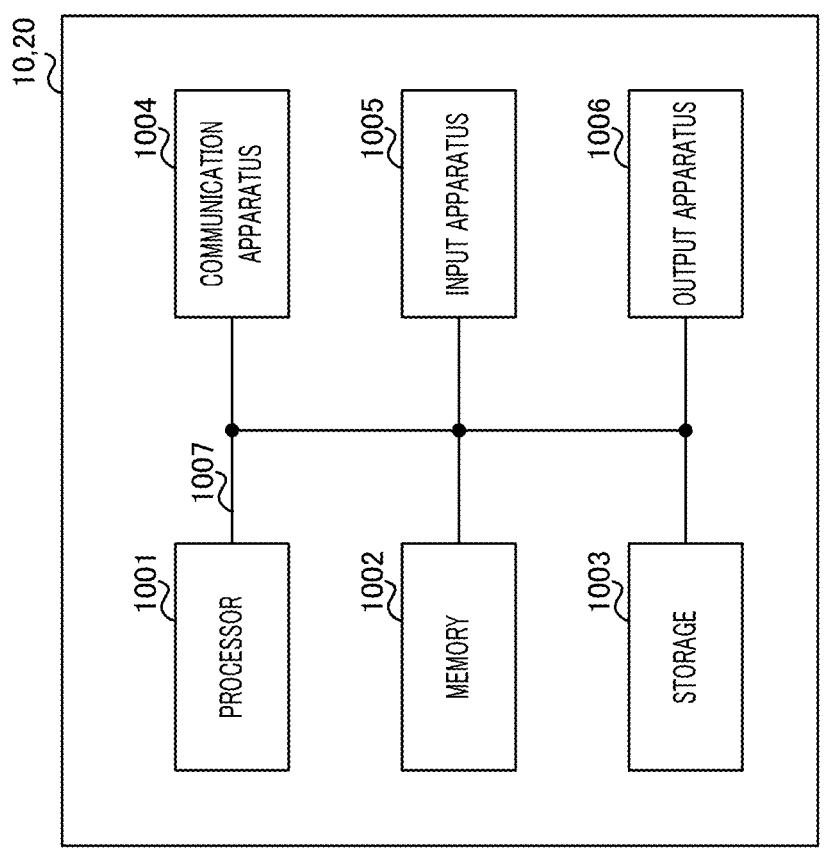
FIG. 9 illustrates an example of a hardware configuration of the radio base station and the user terminal according to the present invention.

For example, the radio base station, the user terminal, and the like according to one embodiment of the present invention may function as a computer that executes processing of a radio communication method of the present invention. FIG. 9 illustrates an example of a hardware configuration of the radio base station and the user terminal according to one embodiment of the present invention. Radio base station 10 and user terminal 20 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, discovery signal generation section 101, candidate weight multiplication section 102, reference signal generation section 103, access point selection section 104, weight selection section 106, judgement section 107, precoding matrix generation section 108, data generation section 109, precoding section 110, beam-forming section 111, candidate weight information measurement section 203, channel estimation section 204, postcoding matrix generation section 205, postcoding section 206, data reception section 207, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in embodiments. For example, at least part of the functional blocks constituting radio base station 10 and user terminal 20 may be realized by a control program stored in memory 1002 and operated by processor 1001, and the other functional blocks may also be similarly realized. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to one embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disk, or a Blue-ray (registered trademark) disk), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, communication sections 112 and 202, antennas 113 and 201, inter-base station communication section 105, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by other methods. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and the like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station (radio base station) in the specification may be performed by an upper node depending on the situation. Various operations performed for communication with a terminal in a network constituted by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Judgement Method)

The judgement may be made based on a value expressed by 1 bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or other remote sources by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompasses a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names. The demodulation RS and the correction RS may be prescribed by the same name (for example, demodulation RS).

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including", "comprising", and modifications of these are intended to be inclusive just like the term "having", as long as the terms are used in the present specification or the appended claims. Furthermore, the term "or" used in the present specification or the appended claims is not intended to be an exclusive or.

The radio frame may be constituted by one or a plurality of frames in the time domain. One or each of a plurality of frames may be called a subframe, a time unit, or the like in the time domain. The subframe may be further constituted by one or a plurality of slots in the time domain. The slot may be further constituted by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, a mini slot, and the symbol indicate time units in transmitting signals. The radio frame, the subframe, the slot, the mini slot, and the symbol may be called by other corresponding names.

For example, in the LTE system, the base station creates a schedule for assigning a radio resource to each mobile station (such as frequency bandwidth that can be used by each mobile station and transmission power). The minimum time unit of scheduling may be called a TTI (Transmission Time Interval), or one mini slot may be called a TTI.

For example, one subframe may be called a TTI. A plurality of continuous subframes may be called a TTI. One slot may be called a TTI.

The resource unit is a resource assignment unit of the time domain and the frequency domain, and the resource unit may include one or a plurality of continuous subcarriers in the frequency domain. One or a plurality of symbols may be included in the time domain of the resource unit, and the length may be one slot, one mini slot, one subframe, or one TTI. One TTI and one subframe may be constituted by one or a plurality of resource units. The resource unit may be called a resource block (RB), a physical resource block (PRB: Physical RB), a PRB pair, an RB pair, a scheduling unit, a frequency unit, or a subband. The resource unit may be constituted by one or a plurality of REs. For example, it is only necessary that one RE be a resource in a unit (for example, minimum resource unit) smaller than the resource unit serving as a resource assignment unit, and the naming is not limited to RE.

The structure of the radio frame is exemplary only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be combined and used, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to the embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-026241 filed on Feb. 15, 2017, and the entire content of Japanese Patent Application No. 2017-026241 is hereby incorporated by reference.

INDUSTRIAL APPLICABILITY

An aspect of the present invention is useful for a mobile communication system.

REFERENCE SIGNS LIST

10 Radio base station
20 User terminal
30 Control station
101 Discovery signal generation section
102 Candidate weight multiplication section
103 Reference signal generation section
104 Access point selection section
105 Inter-base station communication section
106 Weight selection section
107 Judgement section
108 Precoding matrix generation section
109 Data generation section
110 Precoding section
111 Beam-forming section
112, 202 Communication section
113, 201 Antenna
191 Coding section
192 Modulation section
203 Candidate weight information measurement section
204 Channel estimation section
205 Postcoding matrix generation section
206 Postcoding section
207 Data reception section
271 Demodulation section
272 Decoding section

The invention claimed is:

1. A first radio base station in a radio communication system that performs MIMO transmission between a plurality of radio base stations and at least one user terminal, the first radio base station comprising:

a precoding section that applies precoding to a data signal based on channel information indicating channels between the radio base stations and the user terminal; and a communication section that transmits the precoded data signal, wherein the precoding in the first radio base station of the plurality of radio base stations is applied based on the channel information including at least a channel between the first radio base station and a first user terminal connected to a second radio base station other than the first radio base station, and wherein beam-forming by the first radio base station whose amount of used resources is smaller than a threshold among the plurality of radio base stations forms beams for the user terminal connected to the second radio base station.

2. The first radio base station according to claim 1, wherein the precoding in the first radio base station of the plurality of radio base stations is applied based on the channel information including a channel between the first radio base station and a second user terminal connected to the first radio base station and a channel between the first radio base station and the first user terminal.

3. The first radio base station according to claim 1, wherein when the first user terminal is connected to both of the first radio base station and the second radio base station, the precoding for the first user terminal is applied based on the channel information including the channel between the first radio base station and the first user terminal and the channel between the second radio base station and the first user terminal.

4. A radio communication method in a radio communication system that performs MIMO transmission between a plurality of radio base stations and at least one user terminal, the radio communication method comprising:

applying precoding to data signals based on channel information indicating channels between the radio base stations and the user terminal; and transmitting the precoded data signals, wherein the precoding in a first radio base station of the plurality of radio base stations is applied based on the channel information including at least a channel between the first radio base station and a first user terminal connected to a second radio base station other than the first radio base station, and forming beams for the user terminal connected to the second radio base station via beam-forming by the first radio base station whose amount of used resources is smaller than a threshold among the plurality of radio base stations.

* * * * *